United States Patent Office 3,445,202
Patented May 20, 1969

---

3,445,202
PHOSPHOROUS COMPOUNDS
Peter John Grey, Aldershot, England, assignor to BTR Industries Limited, London, England, a British company
No Drawing. Filed Feb. 28, 1964, Ser. No. 348,283
Claims priority, application Great Britain, Mar. 1, 1963, 8,259/63
Int. Cl. C01f *11/36;* C01b *21/10*
U.S. Cl. 23—357  12 Claims

ABSTRACT OF THE DISCLOSURE

Anhydrous metal phosphoro-diamidates are prepared by reacting a metal or anhydrous metal compound with an organo orthophosphoric-diamidate in a polar solvent, or alternatively by reacting an anhydrous metal (other than alkali metal) salt with an anhydrous alkali metal orthophosphoro-diamidate in a dry non-aqueous polar solvent. On heating in inert atmosphere to a temperature of from 125° C. to 900° C. the orthophosphoro-diamidic salts form a foam. On heating either the original compound or the foam produced therefrom to a temperature of from 400° C. to 1000° C. a glassy material is produced from which fibers may be drawn.

---

The present invention relates to phosphorous compounds and in particular to phosphoro-diamidates. In one aspect the invention provides a process for preparing anhydrous metal phosphoro-diamidates which process comprises reacting a metal or a metal anhydrous compound with an organo orthophosphoro-diamidate in a dry non-aqueous polar solvent.

This process is preferably carried out by adding a metal or metal compound, e.g. the hydroxide in a non-aqueous solvent to the organo orthophosphoro-diamidate and then stirring the mixture at a temperature within the range from about 20°–90° C. for several hours e.g. from 1 to 48 hours or until a product is precipitated. This product which is the anhydrous metal salt of the orthophosphoro-diamidic acid is filtered off, washed and dried to give an anhydrous salt which may be heated in inert conditions to form a glass or in certain instances a rigid foam material of low density and good thermal and hydrolytic stability which may be isolated as an intermediate product.

Although the alkali and alkaline earth metals such as sodium, potassium, lithium, caesium, magnesium, calcium, strontium, barium and their salts are generally preferred in the process according to the present invention other metallic salts for example certain stannic zinc, cadmium lanthanum ammonium, silver and mercury salts may be used.

In the process according to the present invention the preferred organo orthophosphoro-diamidate is phenyl orthophosphoro-diamidate and the dry non-aqueous polar solvent is preferably an organic solvent which boils at a moderately elevated temperature for example within a range from about 60° C. to 85° C. Examples of such suitable solvents are ethyl alcohol or methyl alcohol.

In another aspect the invention provides a process for preparing anhydrous metal phosphoro-diamidates which process comprises reacting an anhydrous metal (other than an alkali metal) salt with an anhydrous alkali metal orthophosphoro-diamidate in a dry non-aqueous polar solvent. In this case the alkali metal is conveniently sodium, and the metal salt may be for example a water-soluble zinc or alkaline earth metal salts. The double decomposition reaction may be instantaneous in which case prolonged heating and stirring is unnecessary and the insoluble product may be filtered off and dried.

Also included in the invention is a method of preparing inorganic foamed polymers which method comprises heating the metal phosphoro-diamidate prepared as described above to a temperature of from 125° C. to 900° C. in an inert atmosphere, for example nitrogen or ammonia. The foams will preferably have a density of from 0.4 to 1.0 lb. per cubic foot when the sodium salt is used.

Also included in the invention is a method of preparing a glassy material which method comprises heating either the metal phosphoro-diamidate or the inorganic foamed polymer both prepared as described above, to a temperature of from 400° C. to 1000° C. Fibres may be drawn from this glassy material.

These aspects of the invention are illustrated by the following examples.

EXAMPLE 1

A solution of 8.4 gms. lithium hydroxide in 300 ml. ethyl alcohol was added to 17.2 gms. of phenyl orthophosphoro-diamidate at room temperature with continuous stirring over a period of 3 hours. The white precipitate obtained at the end of the period was then filtered off, washed with ethyl alcohol which was flashed off and the product lithium orthophosphoro-diamidate was finally dried over phosphorus pentoxide. The yield was 10.1 gms. (99.5 percent theory) of the anhydrous lithium salt. A chemical analysis revealed the following composition:

P, 29.8 (theory 30.4); N, 27.5 (theory 27.45); Li, 6.6 (theory 6.8).

A possible equation for the reaction may be expressed as follows:

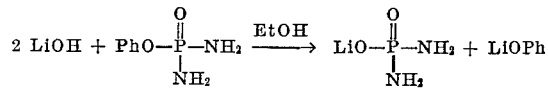

The lithium salt so obtained was then heated at 900° C. to yield a glass from which fibres of good physical properties were drawn.

EXAMPLE 2

69 gms. sodium metal were added at room temperature with continuous stirring to 172 gms. of phenyl orthophosphoro-diamidate suspended in 3,000 ml. of ethyl alcohol over a period of 3 hours. During this period the temperature rose to 50° C. at which temperature the reaction was maintained by external cooling. When the sodium metal had completely dissolved the reaction medium was cooled and the precipitated product was filtered off, washed with 600 ml. ethyl alcohol and dried in vacuo at 30° C. The product was anhydrous sodium orthophosphoro-diamidate yield 116.5 gms. (99 percent theoretical yield) and analysis revealed the composition:

P, 26.2 (theory 26.3); N, 23.3 (theory 23.7); Na. 19.4 (theory 19.5).

The reaction mechanism was probably as follows:

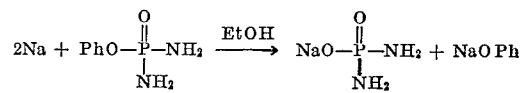

When the anhydrous product so formed was heated to 200° C. in dry nitrogen at atmospheric pressure ammonia was evolved and a foam of low density and good thermal stability was produced. A possible reaction mechanism is expressed as follows:

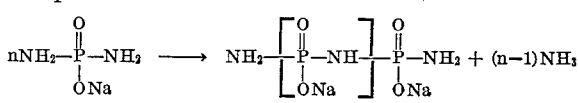

When this foam product was heated further at elevated temperature within the range 500 to 1,000° C. it yielded a glass of good physical properties and from which fibre was successfully drawn.

EXAMPLE 3

To a suspension of 3.44 gm. phenyl orthophosphoro-diamidate in 60 ml. ethyl alcohol was added 6.0 gm. caesium hydroxide and the whole refluxed for 1 hour. The white crystalline product was isolated, washed with 50 ml. of alcohol and dried at 30° C./1 mm. The yield was 4.56 gm. (77% of theory) and chemical analysis revealed the composition:

P, 13.9 (theory 13.6); N, 12.0 (theory 12.3); Cs, 57.9 (theory 58.4).

EXAMPLE 4

To a solution of 14.2 gm. of sodium orthophosphoro-diamidate (Example 2) dissolved in 500 ml. of dry methyl alcohol was added at ambient temperature a solution of 8.2 gm. anhydrous zinc chloride in 200 ml. dry methyl alcohol. The white crystalline precipitate which formed was immediately isolated, washed with 150 ml. of methyl alcohol and dried at 30° C./1 mm. The yield was 14.5 gm. (95% of theory); chemical analysis revealed the composition:

P, 24.1 (theory 24.3); N, 21.1 (theory 21.1); Zn, 25.0 (theory 25.5).

All the inorganic orthophosphoro-diamidates produced as in Examples 1 to 5 when heated under anhydrous conditions undergo a condensation polymerisation by way of an intermolecular elimination of ammonia. They are capable of yielding at lower temperatures rigid lightweight foams which are stable, when the cation is bivalent, up to at least 700° C., but which at higher temperatures collapse to form a glass from which satisfactory fibres were drawn. All such glasses finally decompose in the region 1,050–1,100° C.

The bulk density of the foam could be varied by altering either the rate of heating the dwell time at maximum temperature, the total pressure or the partial pressure of ammonia within the system. This aspect of the invention is illustrated by the following example.

EXAMPLE 5

To a solution of 11.8 g. sodium orthophosphoro-diamidate (Example 2) dissolved in 500 ml. anhydrous methyl alcohol at 50° C. was added with stirring 5.6 g. pure anhydrous calcium chloride dissolved in 500 ml. anhydrous methyl alcohol. Upon completing the addition the solution was maintained at 50° C. for a further 30 minutes. The precipitate was isolated, washed well with methanol, and dried at 40° C./2 mm. The yield was 11.4 g. (97% theory), chemical analysis revealing the composition:

Actual: P, 26.4%; N, 24.1%; Ca, 16.7%; $CH_3O-$, 0.4%. Theory: P, 26.9%; N, 24.3%; Ca, 17.0%; $CH_3-$, Nil.

EXAMPLE 6

Sodium orthophosphoro-diamidate was heated slowly to 375° C. in a nitrogen atmosphere at 1 atmospheric pressure to yield a foam of bulk density 1.0 lb. per cu. ft. When the same compound was heated rapidly to 375° C. under the same conditions it yielded a foam of bulk density 0.6 lb. per cu. ft.

Also it was found that when the same compound was heated in an identical manner in an ammonia atmosphere it yielded a foam of bulk density 0.4 lb./cu. ft.

All foams so produced were hydrolytically and dimensionally stable up to 395° C.

The invention provides in a different aspect a method of forming a mass of an inorganic foamed polymer which method comprises separately heating tablets of an anhydrous metal phosphoro-diamidate under conditions to form partially formed polymer bodies, and subsequently heating a mass of the partially foamed polymer bodies so that further foaming takes place to form a fused mass of an inorganic foamed polymer.

The preferred metal phosphoro-diamidates are those of zinc, calcium and strontium. The formation of coherent tablets of these materials requires a pressure of at least 2 tons per square inch, and pressures of up to 20 tons per square inch may conveniently be used although use of high pressure does not alter the foaming characteristics of the tablet. It may be desirable to incorporate 1% by weight of a material such as magnesium stearate into the monomer salt to effect lubrication of the mould used for the tabletting step.

When tablets weighing more than 5 grams are heated, the resulting foam is liable to be incompletely condensed at the core, and it is therefore preferred to use tablets weighing 50 to 100 mgs. The tablets may have the form of a 3/16" diameter cylinder and approx. 0.1" thick.

When the zinc salt is used, the tablets are preferably separately heated at a temperature of from 650° C. to 750° C. and a mass of the resulting partially foamed polymer bodies heated at a temperature of from 750° C. to 850° C.

When the calcium or strontium salt is used, the tablets are preferably separately heated at a temperature of from 750° C. to 850° C. and a mass of the resulting partially foamed polymer bodies heated at a temperature of from 850° C. to 950° C.

Following is a description by way of example of methods according to this aspect of the invention.

EXAMPLE 7

Zinc phosphoro-diamidate was mixed with 1% by weight of magnesium stearate as a lubricant, and formed into tablets having the form of 3/16" diameter cylinders at a pressure of 2 tons per square inch.

The tablets were separately heated at 700° C. for five minutes to give spherical partially foamed polymer bodies.

The partially foamed polymer bodies were packed randomly in a graphitised metal tray measuring 6" x 6" x 1" deep (the sides being detachable) and immersed in a thermal sink at 800° C. for 10 minutes. The mass became slightly plastic and expanded as the spheres underwent further polymerisation and fusion.

The product was a homogeneously condensed foam of good geometry, which upon dissection showed no trace of the individual partially foamed polymer bodies from which it was derived.

EXAMPLE 8

Calcium phosphoro-diamidate was mixed with 1% by weight of magnesium stearate. The mixture did not have good flow characteristics, and required prior compaction in a slugging machine followed by granulation and sieving through a 16 mesh screen. The coarser powder which resulted had the necessary flow properties and was compacted into 3/16" diameter cylindrical tablets.

Individual tablets were immersed in a thermal sink at 800° C. and their change in dimensions determined relative to the duration of heating. The results obtained are listed in Table I.

TABLE I.—THERMAL POLYMERISATION OF CALCIUM SALT TABLETS AT 800°C.

| Dwell time (min.) | Dimensions | |
|---|---|---|
| | Diam.(in.) | Thickness(in.) |
| 0.0 | 0.187(3/16) | 0.104 |
| 0.5 | 0.189 | 0.108 |
| 1.0 | 0.194 | 0.116 |
| 1.5 | 0.236 | 0.138 |
| 2.0 | 0.287 | 0.340 |
| 3.0 | 0.317 | |
| 5.0 | 0.318 | |
| 10.0 | 0.320 | |
| 15.0 | 0.320 | |
| 30.0 | 0.320 | |

The tablets retained their cylindrical shape at 800° C. for approximately 3 minutes, after which time they became spherical. As the requirement was for a partially condensed material, a dwell time of 1.5 minutes at 800° C. was employed.

The partially condensed polymer bodies were packed randomly in a graphitised metal tray measuring 6" x 6" x 1" deep (the sides being detachable) and immersed in a thermal sink at 900° C. for 12 minutes. Although the mass did not become quite so plastic as the zinc salt during fusion, the result was very similar and equally successful.

EXAMPLE 9

Strontium phosphoro-diamidate tablets were prepared and treated in the manner described in Example 8 for calcium, with the results given in Table II.

TABLE II.—THERMAL POLYMERISATION OF STRONTIUM SALT TABLETS AT 800° C.

| Dwell time (min.) | Dimensions | |
|---|---|---|
| | Diam.(in.) | Thickness(in.) |
| 0.0 | 0.187(3/16) | 0.110 |
| 0.5 | 0.190 | 0.114 |
| 1.0 | 0.195 | 0.122 |
| 1.5 | 0.240 | 0.220 |
| 2.0 | 0.287 | 0.310 |
| 3.0 | 0.361 | |
| 5.0 | 0.364 | |
| 10.0 | 0.366 | |
| 15.0 | 0.366 | |
| 30.0 | 0.366 | |

The behaviour of the strontium salt was closely related to that of the calcium salt. Accordingly, a dwell time of 1.5 minutes at 800° C. was employed. A mass of the partially condensed polymer bodies were treated as described in Example 8. The nature of the product was the same as for the calcium salt.

The properties of the products of Examples 7, 8 and 9 were as follows:

Bulk density

Foam: Bulk density, lbs./cu. ft.
Zinc salt _____ 8.0±0.5
Calcium salt _____ 6.5±0.5
Strontium salt _____ 6.0±0.5

Dimensional stability (unloaded specimen)

A sample of foam measuring approximately 0.75" x 0.5" x 0.5" was heated for two hours at each 50° C. interval in the range 500–1000° C. until a reduction in dimensions was observed. All experiments were performed under laboratory atmosphere conditions.

Foam: Temperature limit of dimensional stability, °C.
Zinc salt _____ 650
Calcium salt _____ 850
Strontium salt _____ 850

Compressive strength

Foam: Compressive strength at complete failure, p.s.i.
Zinc salt _____ Ca. 45
Calcium salt _____ Ca. 37
Strontium salt _____ Ca. 35

Hydrolytic stability at 500° C.

Each specimen was heated at 500° C. in an atmosphere of nitrogen saturated with water vapour at 30° C. Any ammonia released by hydrolytic attack was absorbed in water and titrated with standard acid. Heating was continued for a period of two hours after the evolution of ammonia had ceased.

| Foam | Nitrogen content, percent | Percent original nitrogen hydrolytically replaced | Time at 500° C. (hrs.) |
|---|---|---|---|
| Zinc salt | 7.9 | 4.6 | 5.5 |
| Calcium salt | 8.8 | 1.2 | 4.3 |
| Strontium salt | 7.2 | 1.7 | 3.8 |

The hydrolytic stability of the phosphorus-nitrogen bond in each foam appeared to exceed 95% at 500° C.

Aqueous stability

This was determined by heating the sample in boiling water for a period of 5 and 48 hours, after which the foam was dried at 40° C./1 mm. to constant weight.

| Foam | Loss in weight 5 hrs. | Loss in weight 48 hrs. |
|---|---|---|
| Zinc salt | 3.1 | 5.50 |
| Calcium salt | 0.2 | 0.25 |
| Strontium salt | 0.4 | 0.50 |

Thermal and oxidational stability

The zinc foam was completely stable up to 800° C., the calcium and strontium foams likewise up to 900° C.

The invention is not limited to the details of the foregoing examples. For instance the tables may be of other than cylindrical shape, the special problems associated with any particular shape of tablet being readily soluble. Salts other than those of zinc calcium and strontium may be used, and the product mass of inorganic foamed polymer may be formed in any desired shape.

The products are useful as rigid, inorganic, dielectric insulating foams having good resistance to thermal and hydrolytical attack, for example as high-temperature insulants in electric arc shields. The glasses which are also produced according to the invention have a high Young's Modulus and are useful for fibre production.

I claim:
1. A method of preparing an inorganic foamed polymer which method comprises heating the anhydrous phosphorodiamidic salt of a metal of the group consisting of zinc, calcium and strontium, in an anhydrous atmosphere at a temperature of from 150° C. to 900° C. until foaming is effected.

2. A method as claimed in claim 1 wherein the atmosphere is selected from the group consisting of nitrogen and ammonia.

3. An anhydrous phosphoro-diamidate of a metal of the group consisting of zinc, calcium and strontium in a polymeric foamed condition.

4. A method of preparing a glass-like material which method comprises heating an anhydrous phosphorodiamidate of a metal selected from the group consisting of zinc, calcium and strontium to a temperature of from 400° C. to 1000° C., above that temperature required for foaming said anhydrous phosphoro-diamidate, whereby a glass-like polymer is obtained.

5. A method of preparing a glass-like material which method comprises heating the inorganic foamed polymer produced in accordance with claim 1 to a temperature of from 400° C. to 1000° C., such that the foam collapses, and a glass-like polymer is recovered.

6. A glass-like polymer of an anhydrous phosphorodiamidate of a metal of the group consisting of zinc, calcium and strontium.

7. Fibers drawn from the glass-like polymer claimed in claim 6.

8. A method of forming a mass of an inorganic foamed polymer which method comprises separately heating tablets of anhydrous phosphoro-diamidate of a metal of the group consisting of zinc, calcium and strontium to form partially foamed polymer bodies and subsequently heating said partially foamed polymer bodies so that further foaming takes place to form a fused mass of an inorganic foamed polymer.

9. A method as claimed in claim 8 wherein the metal is zinc and the tablets are separately heated at a temperature of from 650° C. to 750° C. to form partially foamed polymer bodies.

10. A method as claimed in claim 9 wherein said partially foamed polymer bodies are heated to a temperature of from 750° C. to 850° C.

11. A method as claimed in claim 8 wherein the metal is selected from the group consisting of calcium and strontium and the tablets are separately heated at a temperature of from 750° C. to 850° C. so as to form partially foamed polymer bodies.

12. A method as claimed in claim 11 wherein said partially foamed polymer is heated at a temperature of from 850° C. to 950° C.

References Cited

Mellor: Comprehensive Treatise on Inorganic and Theoretical Chemistry, vol. 8 (1928), pp. 704, 705, 707.

OSCAR R. VERTIZ, *Primary Examiner.*

HOKE S. MILLER, *Assistant Examiner.*

U.S. Cl. X.R.

23—50; 161—172, 178; 252—378